UNITED STATES PATENT OFFICE

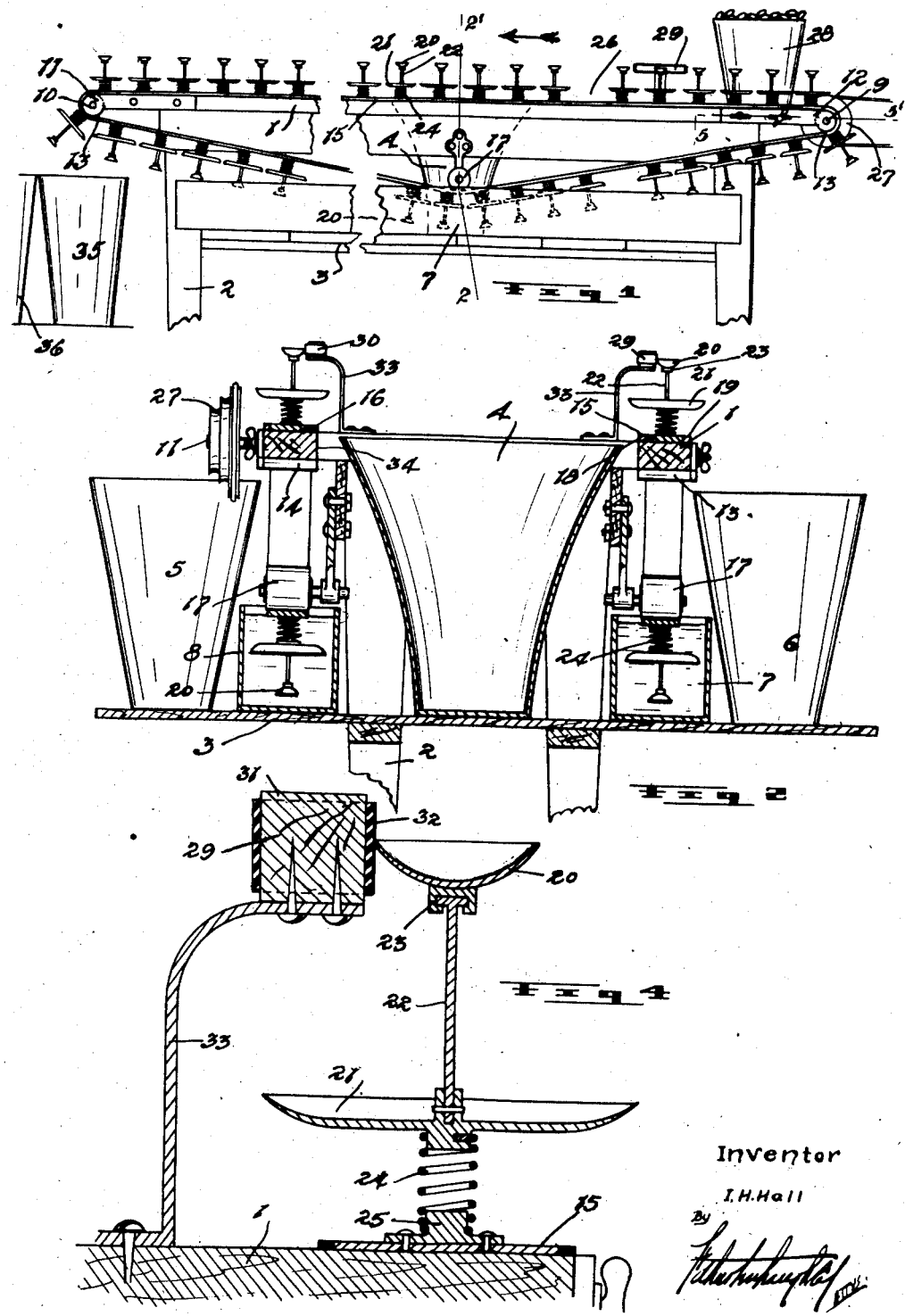

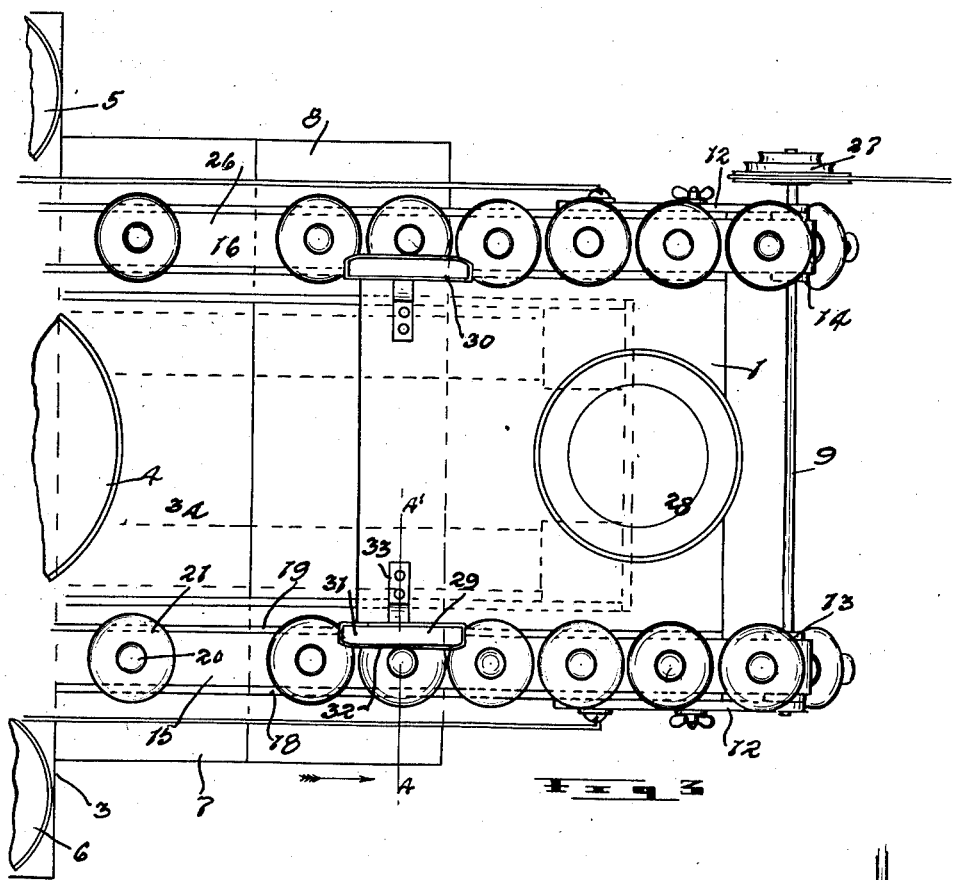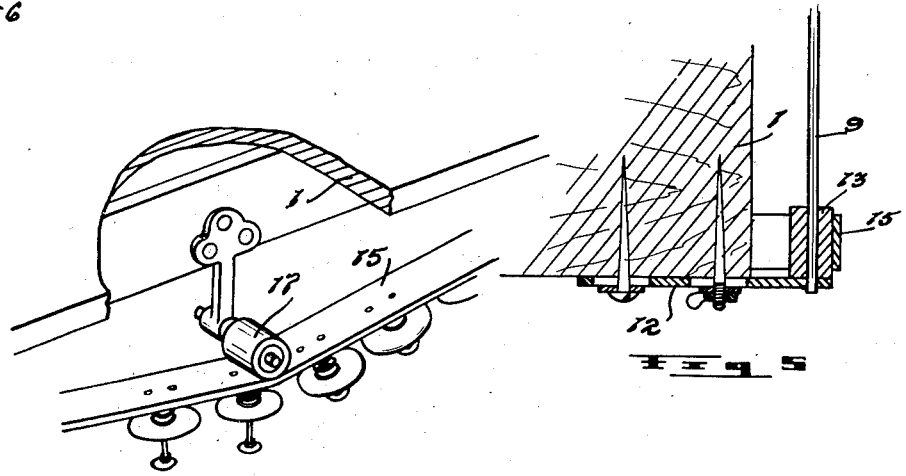

IPHUS H. HALL, OF WINNIPEG, MANITOBA, CANADA, ASSIGNOR TO HALLS LIMITED, OF TORONTO, CANADA, A CORPORATION OF CANADA

LIQUID-EGG SEPARATING AND GRADING MACHINE

Application filed April 26, 1929. Serial No. 358,337.

The invention relates to a liquid egg separating and grading machine and a general object of the invention is to provide a machine which will speed up the work of separating and grading liquid eggs and will allow a considerable quantity of eggs to be separated and graded in a relatively short time and by two operators, provision being made to receive the various grades.

A further object of the invention is to provide a machine employing an endless driven conveyor, the speed of travel of which can be varied if desired, the conveyor carrying a plurality of yolk and albumen receiving cups which are mounted so that they can be upset to either side of the conveyor as desired by the operator to discharge their contents and which if not touched by the operator, automatically discharge the contents when they reach one end of the conveyor, such arrangement providing for the quick and effective initial separating of the yolks and whites (albumen) and of the subsequent quick and effective grading.

A further object of the invention is to construct the cups so that each egg separating unit, embodying a yolk cup and an albumen cup, can be manufactured at comparatively small cost and quickly dismounted from the conveyor in event an inedible egg is encountered and such that when the unit is laterally deflected, it will reset itself in the original position and further to arrange the several units so that when they discharge their contents they will throw the same clear of the conveyor or other parts of the machine to be caught in pails or other receptacles provided.

A still further object of the invention is to design the machine so that the units carried by the belt will be washed and sterilized after they have discharged their contents and before returning to receiving position.

A further object of the invention is to provide means for positively and automatically cutting the whites from the yolks after the yolks have been deposited in the egg cups.

With the above more important objects in view, the invention consists essentially in the arrangement and construction of parts hereinafter more particularly described, reference being had to the accompanying drawings, in which:—

Fig. 1 is a side view of the machine constructed in accordance with my invention.

Fig. 2 is an enlarged detailed vertical sectional view at 2—2' Figure 1.

Fig. 3 is an enlarged detailed plan view of one end of the machine.

Fig. 4 is an enlarged detailed vertical sectional view at 4—4' Figure 3.

Fig. 5 is an enlarged detailed horizontal sectional view at 5—5' Figure 1.

Fig. 6 is a perspective view of one of the idler rollers.

In the drawings like characters of reference indicate corresponding parts in the several figures.

I have herein shown two conveyors located at opposite sides of a supporting table and each conveyor is provided with a plurality of yolk and albumen receiving cups but in this connection, I might mention that the two conveyors simply give increased capacity and that one conveyor alone could be used if desired. As the conveyors and parts associated therewith are identically constructed, the description of one will suffice.

The table top 1 is supported in the usual manner by corner legs 2 and the legs support a suitable under shelf 3 which provides a support for a central receptacle 4 and two side receptacles 5 and 6 and also supports two tanks 7 and 8. The table overhangs the legs at the sides and is provided at the ends with cross shafts 9 and 10, the shafts being rotatably mounted in fixed bearings 11 at one end of the table and adjustable bearings 12 at the other end of the table. On each shaft, I mount two rollers 13 and 14 and the rollers carry similar endless conveyors 15 and 16 in the form of belts, the top sides of the belts overlying the edges of the table and the under sides thereof underlying the same.

The table carries an idler roller 17 for each belt, the idler roller in each instance holding the underlying central part of each belt pressed in a flattened V-shaped manner as best shown in Figure 1 and being arranged so that the depressed portions of the conveyors centrally enter the tanks. One can tighten up the conveyor or belt should the same become too slack by means of the adjustable bearings 12. The top sides of the belts pass between guide strips 18 and 19 secured to the top face of the table, the belts actually dragging over the top of the table when operated.

The belt carries in each instance a plurality of similar egg separators which are attached to the belt side by side in groups and continue throughout the length of the belt. Each separator or unit embodies an elevated yolk cup 20 and an underlying white or albumen cup 21, the albumen cup being provided with an upstanding centrally located shank 22 of predetermined length which has the upper end thereof rotatably supporting as indicated at 23 the yolk cup, the arrangement being such that the yolk cup can rotate freely on the upper end of the shank.

The albumen cup is suspended in a horizontal position and slightly elevated above the belt by a coiled spring 24 which allows lateral tilting of both the yolk cup and the albumen cup to discharge their contents. The spring has one end firmly fastened to the albumen cup and the other end detachably connected to the belt, such permitting of the unit being dismounted from the belt when desired. I have herein shown the belt as supplied with an upstanding stud 25 which enters the lower end of the spring and sufficient friction is developed between the spring and the stud to hold the spring to the belt for all normal operating conditions of the device but permit of the same to be forcibly pulled off when desired.

Obviously the spring forms a flexible support for the cups and it will also cause the spindles to normally maintain an upright position with the cups horizontal and will effect the returning of any shank to its upright position after the same has been laterally deflected by the hand as later described. The units are preferably located on the belt in groups say of six, there being a space indicated at 26 between the groups which is of value to the operator as later disclosed. The shaft 9 is provided with a cone pulley 27 which can be driven by an applied belt and such also provides of a variation in the speed of travel of the belt.

From the above, it will be apparent that when the belt is driven say in the direction of the applied arrow Figure 1 that the cups will be moving continuously over the top side of the table from the right hand end to the left hand end and that they will also all be successively immersed in the sterilizing tank which latter will contain say water heated to a proper temperature for sterilizing purposes.

On the right hand end of the table and between the belts, I mount an egg pail or receptacle 28 and adjoining it I locate two cutters 29 and 30, one for each belt. Each cutter is in the form of a lengthwise extending stationary block 31 having a rubber face 32 and the rubber faced block is adapted in each instance to contact with the passing yolk cups and effect the rotation of the yolk cup on the spindle. The block is supported in each case by a bracket 33 fastened to the table top. The central part of the table is provided with a longitudinally extending opening 34 and through this opening, selected yolks and whites can be dumped from the units into the receptacle 4. At the end of the table remote from the receptacle 28, I locate two other receptacles 35 and 36, only part of the receptacle 36 being herein shown.

The device as herein constructed will require four operators, two at each side of the table, there being two egg breakers and two egg inspectors, the egg breakers standing one at each side of the right hand end of the table and the inspectors preferably being seated one at each side of the table and in a location slightly to the left of the egg breakers.

The machine will be driven say at a speed so that approximately forty eight egg units will pass a given point per minute. The egg breaker will take the eggs from the pail 28, crack the same and deposit the yolk in a passing yolk cup which cup is designed to just hold the yolk. She naturally has to work quickly to keep up with the passing cups as each cup requires to be filled. The albumen or white of the deposited egg will flow over from the elevated yolk cup and will be caught in the underlying albumen cup. There may be a tendency for some of the albumen to cling to the yolk cup but it will be effectively cut off by the cutter which engages with the passing yolk cup and cooperates therewith to sever the albumen, it being understood that the edge of the yolk cup is more or less sharp.

Immediately each cup has passed the cutter, the yolk is in the yolk cup and the albumen is in the albumen cup and the egg tester than smells the yolk and determines just what is to be done. If the yolk in her opinion is bad or inedible, she removes the unit from the belt. If in her opinion, it is number one grade with the yolk unbroken, she permits that unit to pass. If the operator in breaking the egg or through some other irregularity breaks the yolk so that the white and albumen became mixed and the egg is, however, of number one grade, the second attendant will laterally swing the containing unit to the side and dump say into the pail 4.

Should any passing unit contain an egg which the inspector grades as number 2, she will tilt the unit containing it in the opposite direction and dump it into say the pail 5. As the units are passing her relatively quickly, she is required to work fast. The number 1 grade whole yolk eggs are automatically dumped at the end of the belt, the albumens being deposited in the vessel 35 and the yolks in the vessel 36. After the eggs have been deposited, the empty units are sterilized by being passed through the tank.

According to the above, it will be apparent that the whole operation is a speedy one and permits of the separation and grading of the eggs, each belt being attended by two operators.

I have found it desirable to place the units on the belt in groups with a slight space between each group. This avoids the inspector making any mistake in testing as she can locate any particular unit in respect to the space and so know which unit she last tested should her attention be momentarily taken from her work.

What I claim as my invention is:—

1. In a liquid egg separating and grading machine, a horizontally disposed driven endless conveyor, a support over which the top side of the conveyor operates and a plurality of similar egg receiving units carried by the conveyor, each unit embodying a yolk cup and an underlying albumen cup and being mounted to permit of the selected upsetting of any unit to discharge the contents of the cups at either side of the conveyor and means associated with the underside of the conveyor for sterilizing the passing cups.

2. In a liquid egg separating and grading machine, a horizontally disposed driven endless conveyor, a support underlying the upper side of the conveyor, a plurality of similar units mounted on the conveyor, each unit embodying a yolk cup and an underlying albumen cup and being attached to the conveyor by a yielding support permitting of the lateral tilting of any selected unit and the consequent upsetting of the cups thereof.

3. In a liquid egg separating and grading machine, a horizontally disposed driven endless conveyor, a support underlying the upper side of the conveyor, a plurality of similar units mounted on the conveyor, each unit embodying a yolk cup and an underlying albumen cup and being attached to the conveyor by a yielding support permitting of the lateral tilting of any selected unit and the consequent upsetting of the cups thereof and a sterilizing tank associated with the underside of the conveyor and through which the units are passed for sterilizing purposes.

4. In a liquid egg separating and grading machine, an endless driven conveyor, a plurality of similar units yieldingly mounted on the conveyor for lateral tilting, each unit embodying an elevated yolk cup and an underlying albumen cup, the yolk cup being rotatably supported and a stationary elevated cutter positioned in regard to the passing units such that it will engage with the individual passing yolk cups and rotate the same.

5. In a liquid egg separating and grading machine, the combination with a conveyor, of a separating and grading unit embodying an elevated yolk cup and an underlying albumen cup and a flexible connection connecting the albumen cup to the conveyor.

6. In a liquid egg separating and grading machine, the combination with a conveyor, of an egg separating and grading unit comprising an albumen cup flexibly supported on the conveyor, a shank extending upwardly centrally from the albumen cup and a yolk cup rotatably mounted on the upper end of the shank.

7. In a liquid egg separating and grading machine, the combination with a conveyor, of a normally horizontally disposed albumen cup carried by the conveyor and mounted to permit of the upsetting of the cup to either side of the conveyor, a shank extending centrally upward from the albumen cup and a horizontally disposed yolk cup carried by the upper end of the shank.

8. In a liquid egg separating and grading machine, the combination with a conveyor, of a normally unstanding coiled spring attached to the conveyor, a horizontally disposed albumen cup mounted on the upper end of the spring, a shank extending centrally upwardly from the albumen cup and a horizontally disposed yolk cup mounted on the upper end of the shank.

9. In a liquid egg separating and grading machine, the combination with a conveyor, of a normally upstanding coiled spring attached to the conveyor, a horizontally disposed albumen cup mounted on the upper end of the spring, a shank extending centrally upwardly from the albumen cup and a horizontally disposed yolk cup rotatably mounted on the upper end of the shank.

10. In a liquid egg separating and grading machine, the combination with a conveyor, of a normally upstanding coiled spring having the lower end thereof detachably fastened to the conveyor, a normally horizontally disposed albumen cup carried by the upper end of the spring, a stiff shank extending centrally upwardly from the albumen cup and a horizontally disposed yolk cup mounted on the upper end of the shank.

Signed at Winnipeg, this 2nd day of February, 1929.

IPHUS H. HALL.